United States Patent [19]

Tamura

[11] 4,169,567

[45] Oct. 2, 1979

[54] HELICOPTER LIFTING AND PROPELLING APPARATUS

[76] Inventor: Raymond M. Tamura, 218 Lagoon Dr., Honolulu, Hi. 96819

[21] Appl. No.: 788,528

[22] Filed: Apr. 18, 1977

Related U.S. Application Data

[63] Continuation-in-part of Ser. No. 532,646, Dec. 13, 1974, abandoned.

[51] Int. Cl.² ............................................. B64C 21/02
[52] U.S. Cl. ................................. 244/17.11; 60/39.52; 60/263; 416/91; 244/207; 244/208
[58] Field of Search ............................ 416/91 A, 20 A; 244/204, 207, 208, 209, 17.11, 53 R, 53 A, 58; 60/224, 39.07, 39.09 D, 39.17, 39.5, 39.52, 226 R, 229, 263

[56] References Cited

U.S. PATENT DOCUMENTS

| | | | |
|---|---|---|---|
| Re. 23,105 | 4/1949 | Stalker | 244/208 |
| 2,041,789 | 5/1936 | Stalker | 244/208 |
| 2,164,721 | 7/1939 | Price | 244/208 |
| 2,516,489 | 7/1950 | Stalker | 416/91 |
| 3,442,082 | 5/1969 | Peterson | 60/39.17 |

FOREIGN PATENT DOCUMENTS

| | | | |
|---|---|---|---|
| 499833 | 12/1950 | Belgium | 244/208 |
| 539614 | 11/1931 | Fed. Rep. of Germany | 244/208 |
| 893103 | 3/1944 | France | 244/207 |
| 634332 | 3/1950 | United Kingdom | 416/20 A |

OTHER PUBLICATIONS

Ernst et al., "YC-14 Sys. for Leading Edge BLC," AAAA Paper No. 74-1278, 10-30-31/74.

*Primary Examiner*—Galen L. Barefoot
*Attorney, Agent, or Firm*—James C. Wray

[57] ABSTRACT

A helicopter rotor is formed with spars and ribs. The spars form parts of the surfaces, and long slots are constructed in the spars to provide suction and blower slots. Air is withdrawn in slots nearest the leading edge, and engine exhaust is conducted to a suction/blowing device which in turn blows air through slots near the trailing edge. Helicopter engine exhaust is mixed with air and fuel and is recombusted. Air is drawn into a recombustion chamber of a suction/blowing device from suction surfaces on the helicopter rotor blades. This suctioned air is then re-routed to the slots near the trailing edge and blown over the upper and lower surfaces of the blade.

21 Claims, 6 Drawing Figures

U.S. Patent  Oct. 2, 1979  Sheet 1 of 2  4,169,567
FIG. 1
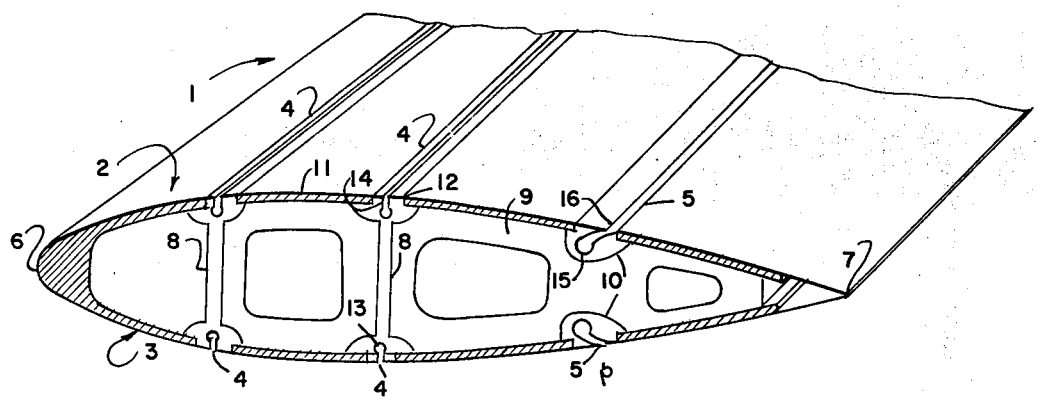
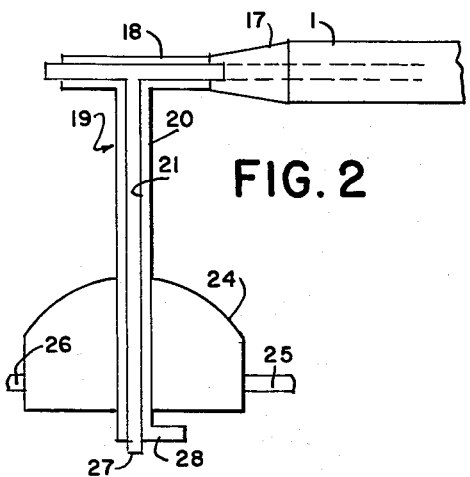
FIG. 2
FIG. 2A
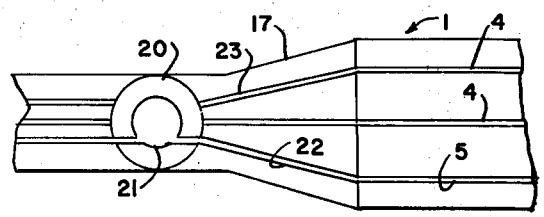
FIG. 3
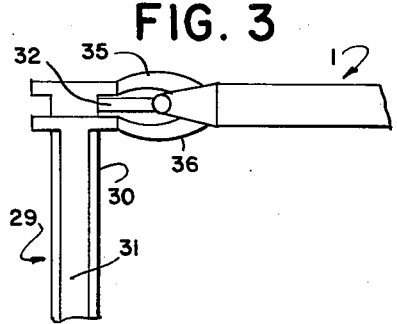
FIG. 3A
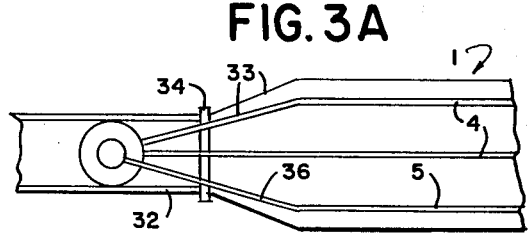

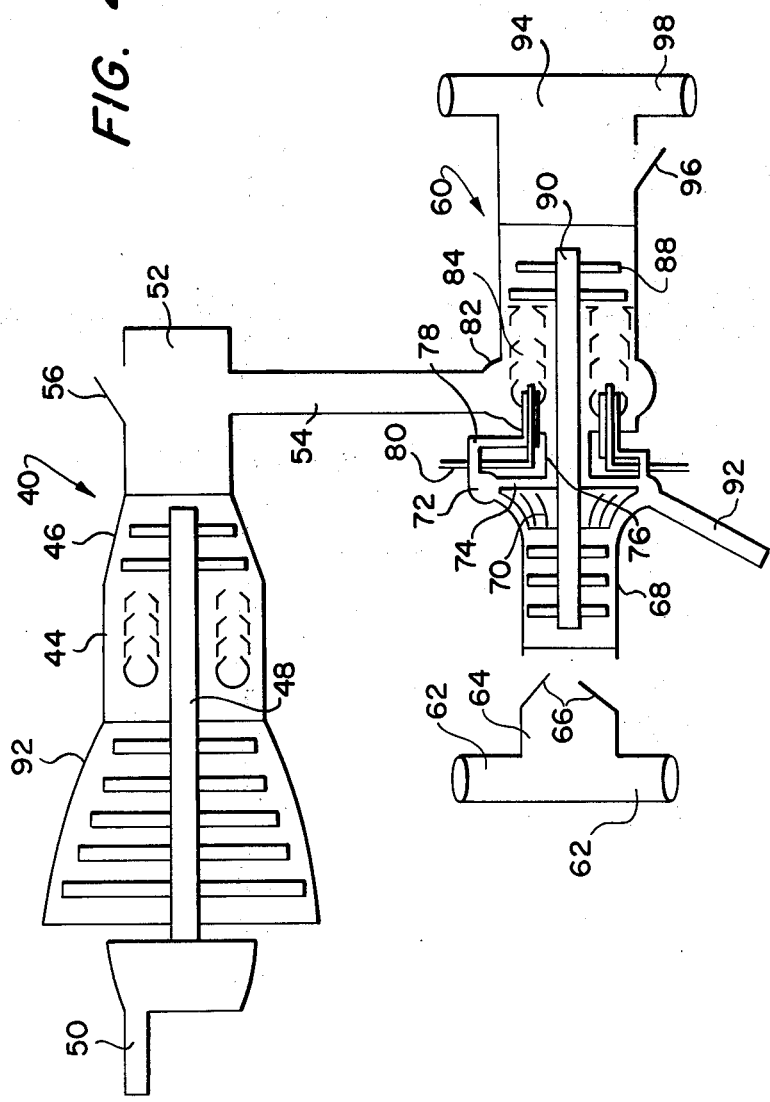

HELICOPTER LIFTING AND PROPELLING APPARATUS

BACKGROUND OF THE INVENTION

This is a continuation-in-part of copending Patent Application Ser. No. 532,646, filed Dec. 13, 1974 by Raymond M. Tamura, entitled Pollution Reducing Aircraft Propulsion and now abandoned.

Helicopters employ turbine and/or reciprocating engines to drive the rotor blades for providing lift and vertical and horizontal propulsion. Unburned hydrocarbons and varied other pollutants such as nitrogen oxides are produced in high temperature operations of the engines. Fuel requirements are magnified by drag of the high speed rotor.

With greater pressures to regulate turbine emissions, there is an urgency in seeking solutions for economical propulsive methods. Low nitrogen oxide levels dictated by the EPA are incompatible with present turbine power plants. Turbine efficiency dictates fuel combustion at higher and higher temperatures. That approach to efficiency creates greater quantities of nitrogen oxides, as well as oxides of sulfur, phosphorus and chromium.

The aviation industry is faced with the tasks of using less fuel and of burning fuel at lower temperatures, which mean incomplete combustion and lowered efficiency, and production of increased carbon monoxide which is prohibited by pollution standards. The present invention seeks to accomplish those tasks and to add efficiencies in the operation of helicopter rotors.

SUMMARY OF THE INVENTION

The present invention is a system which produces high lift during vertical movements and which reduces friction and parasitic drag during cruise without excessive fuel consumption. This effectively reduces the dynamic stall problem of helicopters. The present system utilizes the partially unburned fuel of a reciprocating engine, jet engine or turbine engine to power a turbine which suctions and blows air over rotors. Modified systems withdraw and blow air and exhaust over area-ruled regions of the fuselage and over auxiliary control and stabilizer surfaces.

The present invention employs suction and blower slots on helicopter rotors. In a preferred embodiment, the suction slots are located in a forward part of the rotors and the blower slot is located in an after part of the rotors. Two suction slots are provided on each of the upper and lower surfaces, with the first suction slot being at about 40 to 50 percent of chord. The suction slots are spaced from and aligned with the leading edge of the rotor and extend substantially fully from the roots of the rotors to the tips. In a preferred embodiment single blower slots are provided in the rearward portion of both the upper and lower surfaces of the rotors at approximately 70 to 75 percent of chord.

In preferred embodiments, the rotors are structured with longitudinal spars and transverse ribs, and the slots and ducts which serve the slots are formed within the spars.

Two or more rotor blades are connected to a rotating mast in the preferred configuration. The rotating mast has parallel tubes which are connected to the suction ducts and blower ducts in the blade. Preferably the tubes are concentric, and the outer tube may form the mast.

In one form of the invention, horizontal hinges are provided between the mast and the roots of the rotor blades, and suction and blower ducts connecting the tubes in the mast with the ducts in the rotors are flexible.

In one form of the invention, different and blower pressures are applied to the rotors during different positions in the rotation of the rotors to vary the lift in the forward and rearward directions of the rotors.

This system increases efficiency in a two-fold manner. It extracts the greatest possible quantum of heat energy from a given aliquot of fuel injected into the primary rotor driving engine. By reducing friction drag, a given quantum of propulsive power is translated into greater velocity or greater life.

One embodiment of the invention is described with relation to turbine power plants which are representative of present state of art. In such a system part of the exhaust mass is directed to a combustion section of a compressor-suction turbine. This exhaust from the main turbine is swirled and is mixed with bleed air from the compressor of the compressor-suction turbine. Fresh fuel also is swirled with this mixture. The secondary combustor is of sufficient length to permit more complete combustion.

The quantity of fresh fuel in the compressor-suction turbine is on the order of 0.1 to 0.6 specific fuel consumption.

Exhaust from the compressor-suction turbine is ducted to filleted areas of the fuselage to smooth air flow and is ducted to the area-ruled region of the fuselage for reducing wetted area as well as for increasing air flow velocity.

The compressor suction of the compressor-suction turbine is tied into a system which suctions boundary layers of the rotor blades. This compressor's primary air mass is led to rotor blade ducts which blow air over the rotor blades in a chord-wise direction. That reduces friction drag, since the shear forces between two fluid layers moving in the same direction are much less than shear forces between a solid surface and a fluid media.

In an embodiment used in a main turbine system, the primary exhaust mass is ejected out of the tail pipe as in any other turbo-jet. Combustion gases cool rapidly after passing through the turinbe—especially that layer adjacent to the tail pipe wall. There, combustion has practically ceased. NASA type ducts bleed off that outer layer in the exhaust pipe and direct that mass to the combustion section of the compressor-suction turbine where identical events occur as described earlier.

The exhaust from a reciprocating engine embodiment is also ducted to a compressor-suction turbine where more complete combustion can occur. Manufacturers of these engines face the same prohibitive restrictions as the turbine manufacturers.

The present system has major differences from past attempts. The entire rotor blade surface is blown and suctioned during cruise as well as during vertical movements. Ducts which suction and blow air are integral, weight-bearing structures. Because of the compressor-suction turbine, a slight increase in specific fuel consumption is encountered in reducing effective wetted areas and thereby in reducing drag. The suctioned and blown boundary layer has less shear vectors opposing one another. A laminar flow airfoil rotor blade is used in an example. Supercritical airfoils also benefit from this system. Other airfoils which may be designed at a later date will also benefit. Turbulence is attenuated, and the critical boundary layer is shifted further toward the trailing edge or beyond it. This pushes cruise velocity to a higher subsonic value.

Root and tip velocities and intermediate velocities vary. In helicopter blades the root velocity may be subsonic, while the tip velocity may be supersonic. Both may be subsonic, or both may be supersonic. The blades may have different sections from root to tip. The present invention provides for this automatically by uniform suction and exhaust along the rotor blades or by varying suction and exhaust uniformly according to increments of velocity and section change.

The blower and suction ducts are stringers and integral parts of the primary rotor blade structure. This method avoids the problems created by having separate ducts. A three spar structure is proposed for fail-safe reasons. Skin plates are bonded or brazed to the ducts and ribs.

The suction ducts smooth turbulent flow over leading edges of the rotor blades. Trailing portions of the blades are blown during take-off, landing and most significantly, during cruise. Blown air energizes the very last segment of air flow over the top surface and thus creates a differential pressure which adds to the lift vector during cruise, thereby reducing power requirements.

The present system has the blower duct integral with the rotary wing primary structure.

The system described herein is designed to augment lift as well as to reduce drag. This system is operative in all phases of flight; especially during cruise, which is the greatest segment of flight. An important feature of the invention is the fact that the ducts which are used for suction and blowing of boundary layer air are primary load bearing and therefore are structurally integral with the primary rotary wing structure. This permits a lightweight design.

Past and present efforts in boundary layer systems had non-structural ducts which were not primary load bearing members and therefore not structurally integral. These wings were heavy because of that extra plumbing. Past and present systems have separate primary propulsive engines and suction/blowing engines. No energy from the primary propulsive engine was used in the suction and blowing engines.

The present invention utilizes energy available in unburned fuel from the primary propulsive engine. This unburned fuel is recombusted in the suction/blowing engine. The present invention also utilizes exhaust from the suction/blowing engine to reduce drag over rotary wings, fuselage and control surfaces.

The rationale for suction of boundary layer air is delineated by *Modern Developments in Fluid Dynamics*, Vol. II, edited by S. Goldstein. According to that text, induced drag of fluid flowing over surfaces is caused by separation of a laminar boundary layer. This separation can be prevented, even in the presence of quite large pressure gradients, by a relatively small withdrawal of air from the boundary layer at or near the point where separation occurs. The quantity of air which must be removed may be as little as 5 percent of the total air mass in the boundary layer passing the suction duct. The suction device to accomplish this task need have an efficiency of only 75 percent, and the work required to remove this quantity of air is as little as 3.4 percent of the boundary layer kinetic energy at the point where the suction duct is located.

Thus, the suction/blowing device of the present invention need not be as large as the primary powerplant. This makes the present system unlike systems which use a primary propulsion engine to blow air over the wings. While such devices consume as much fuel as a primary propulsion engine, the present suction/blowing device increases fuel consumption by 0.1 to 0.2 specific fuel consumption. This device can be operated continuously without severe fuel penalties. Since this device uses incompletely burned fuel from the primary propulsion engine, overall efficiency is increased, and there is drastically reduced environmental pollution with nitrogen oxides, carbon monoxide and other harmful combustion by-products.

The suction on the rotary wing is combined with blowing and this system is designed for decreasing drag as well as for generating lift. The present suction slot is 0.67 percent of the chord. This is varied for specific rotary wing sections and designs.

In the present system suction reduces pressure gradient force over anterior surfaces of the rotary wing, since suction removes slow moving air mass which progressively piles up posteriorly from the leading edge. Suction also reduces straining of the fluid as noted in the second term.

Blowing air over the posterior aspects of the rotary wing reduces pressure gradient force by entraining air mass flowing past the point of maximum pressure. That accelerates air mass to the rear, removing pressure created by a piling up of air mass. Another advantage is the reduction of sheer stress between rotary wing surface and fluid. Although blown air velocity need not be equal to the velocity of air moving over the surface, sheer stress will be much less than with an unblown rotary wing. Thus, the first, second and third terms are modified by these mechanisms. Blowing air also reduces the recirculation of air to the leading edge and reduces spatial variation of dilation.

In a preferred embodiment of the invention, helicopter rotor blades have blower and suction ducts constructed integrally with spars which extend through the blades, beneath the skin and interconnect ribs. The ducts support the skin in airfoil configuration. Preferably, the ducts have outward directed elongated slots which extend through the airfoil skin. The skin of the airfoil in one form of the invention is elongated thin aluminum sheets which are secured between adjacent ducts, with slots exposed between adjacent sheet edges.

In one preferred form of the invention the blower ducts are constructed in somewhat tear-shaped cross sections with relatively bulbous parts facing inward and forward, and tapering rearward with smoothly curved relatively flattened out furfaces conforming to the airfoil shape. The outer surface is recessed to receive edges of the skin sheets.

Gas moves longitudinally through a large passageway in the bulbous portions of the ducts. Ducted gasses exit laterally through narrow passageways to the outward slots.

In a preferred form of the invention the blower ducts are arranged at intervals along the rotary wing surface, which intervals generally decrease rearwardly, so that the spaces between slots at a rear surface of the airfoil is less than spaces between slots at a relatively forward portion of the airfoil surface.

Suction ducts communicate with and support the upper rotary wing surface between the leading edge and a line of maximum foil thickness. In a preferred embodiment blower ducts are connected across the remainder of the blade. Blower ducts are provided near the trailing edge of a rotary wing to blow gasses across surfaces of a trailing edge.

The suction duct has the same shape as the blower duct, in one embodiment. In a preferred form the blower duct has a rearward tapering tear-shaped cross section, and the suction duct has symmetrical U-shaped cross section.

All of the ducts are structural members, which preferably act as stringers to transfer loads between the airfoil surface and the ribs of the airfoil. Consequently, little weight is added to the airfoil by the duct system.

In one embodiment of the invention the duct system and the skin are integrated in an apparatus, with a substantially flat slotted surface, and with the ducts forming a raised pattern on the inside surface. In another embodiment of the invention the duct slots are integral with the surface formation and form a foraminous surface. In another form of the invention the actual airfoil surface is not smooth but the aerodynamic surface formed by the blown air cooperating with ambient air is smoothed.

The system of the present invention is useful with all aerodynamic surfaces and is useful with all airfoil plan forms and sections including those especially designed for subsonic, transonic and supersonic operation and those designed for simultaneously varied speeds such as helicopter rotary wings.

In a preferred form of the invention the gas blown through the ducts is chilled to cool the rotary wing surface and thus promote laminar flow of the ambient air. The chilling of the gas is accomplished by heat exchangers in which heat is dissipated by cabin heating and interior space heating. The gas in the blowing ducts is cooled before distribution by contacting the gas with chilled fuselage surfaces and by otherwise refrigerating the gas.

In a preferred embodiment gas is supplied under pressure to the ducts to provide even outflow across the blown surfaces. Areas of increased turbulence and varied velocity and suction are provided with greater blowing gas flow by conventional ducting flow variation techniques. Gas is withdrawn from suction ducts, and gas under pressure is fed to blower ducts by using exhaust energy from propulsion engines.

A blower engine, preferably a turbine, is supplied with air from suction ducts. Demand valves at the inlet are opened automatically upon reduced pressure at the intake to supply ambient air to the auxiliary turbine. Hot exhaust from the propulsion engine is supplied to the combustion section of the auxiliary turbine. Unburned hydrocarbons in the propulsion engine exhaust are oxidized in the excess of air in the turbine. A small amount of fuel is sprayed into the combustion chamber to further burn and drive the exhaust gas from the main engine and the incoming air. The combustion chambers are surrounded by gas spaces to keep the combustion temperatures relatively cool and to ensure complete mixing of the elements for complete combustion. Nitrogen oxides are avoided, and $CO_2$ and water vapor with excess air result.

The gasses flow from the auxiliary turbine into a plenum where overpressures are released automatically to keep the turbine at design operation. The gasses are cooled in a heat transfer refrigeration apparatus and are flowed through conduits to the blower ducts and the outlet slots, where the gas is discharged under pressure rearward along the aerodynamic surface of fuselage and control surfaces.

One object of the invention is the provision of a rotor blade having a leading edge and a trailing edge and surface means interconnecting the leading and trailing edges and having a suction slot in the surface means parallel to the leading edge and a blower slot in the surface means adjacent the trailing edge, and means for withdrawing air from the suction slot and means for conducting fluid to the blower slot, whereby aerodynamic affects of the helicopter rotor are improved.

Another object of the invention is the provision of surface means comprising upper and lower surfaces connecting the leading edge and the trailing edge and the suction slot comprising at least one suction slot in the upper surface and at least one suction slot in the lower surface spaced slightly rearward from and parallel to the leading edge.

Another object of the invention is the provision of the blower slot comprising a blower slot in the upper surface and a blower slot in the lower surface spaced forward from and parallel to the trailing edge.

Another object of the invention is the provision of the rotor comprising longitudinal stringers and substantially perpendicular ribs, wherein the stringers extend to the surface of the rotor, and wherein the slots are located in the stringers.

Another object of the invention is the provision of suction slots open vertically in stringers and blower slots open rearwardly in the stringers.

Another object of the invention is the provision of the rotor connected to a mast, and wherein the mast has parallel suction and blower tubes connected to suction and blower means in the rotor.

Another object of the invention is the provision of concentric blower tubes.

Another object of the invention is the provision of suction and blower tubes rotating with the rotors.

Another object of the invention is the provision of rotors hinged to a mast and flexible connections between the tubes and the rotors.

Another object of the invention is the provision of an engine mounted on the helicopter, means connected to the engine and to the rotors for turning the rotors and merely lifting and propelling the helicopter and an input and output connected to the engine for feeding and exhausting the engine, collecting means connected to the output for collecting matter therefrom, combustion means connected to the collecting means for receiving matter therefrom, intake means connected to the combustion means for flowing combustion sustaining material to the combustion means whereby combustion occurs in the combustion means, exhaust means connected to the combustion means for conducting exhaust from the combustion means, ducting means connected to the exhaust means for conducting exhaust therefrom and distribution means connected to the ducting means and connected to the blower means on an exterior of the helicopter rotors for distributing exhaust from the engine over aerodynamic surfaces of fuselage and control surfaces.

Another object of the invention is the provision of a pollution reducing helicopter propulsion system having a helicopter with a fuselage and rotor surfaces, an engine mounted on the helicopter, means connected to the engine for propelling the rotor and an input and output connected to the engine for feeding and exhausting the engine, collecting means connected to the output for collecting matter therefrom, combustion means connected to the collecting means for receiving matter therefrom intake means connected to the combustion means for flowing combustion sustaining material to the combustion means whereby combustion occurs in the combustion means, exhaust means connected to the combustion means for conducting exhaust from the combustion means, ducting means connected to the exhaust means for conducting exhaust therefrom and distribution means connected to the ducting means and connected to an exterior of the aircraft for distributing exhaust from the helicopter over aerodynamic surfaces of fuselage and control surfaces.

Another object of the invention is the provision of a boundary air blower engine with wing blower ducts connected to the intake compressor and blower means for withdrawing air before combustion and flowing withdrawn air over aerodynamic surfaces of the rotors.

Another object of the invention is the provision of a boundary air blower system wih elongated ducts extending along a rotor beneath its outer surface and having passageways extending to the surface.

Another object of the invention is the provision of a boundary layer blower system with blower ducts mounted along a lower surface of the rotor.

A further object of the invention is the provision of rotor blower ducts having tear-shaped cross sections with bulbous forward sections containing main passageways, and tapered rearward sections containing restricted rearward directed passageways leading to slots on surfaces for blowing gas from the main passageways rearward over the surfaces.

These and further objects and features of the invention are apparent in the disclosure, which includes the foregoing and following specification and claims and the drawings.

BRIEF DESCRIPTION OF THE DRAWINGS

FIG. 1 is a sectional view of a rotor showing the blowing and suction ducts and intake and exhaust slots.

FIG. 2 is a schematic detail of a rotor, mast and transmission.

FIG. 2A is a plan detail of the apparatus shown in FIG. 2.

FIG. 3 is a schematic detail of an alternate form of rotor and mast.

FIG. 3A is a plan detail of the rotor and mast as shown in FIG. 3.

FIG. 4 is a schematic representation of helicopter propulsion engine and an auxiliary turbine for driving the blowing system.

DETAILED DESCRIPTION OF THE DRAWINGS

As shown in FIG. 1, a helicopter rotor blade, generally indicated by the numeral 1 has upper surface 2 and lower surface 3, in which a plurality of suction slots 4 and blower slots 5 are disposed. Suction slots 4 are located nearer the leading edge 6, while the blower slots 5 are located nearer the trailing edge 7.

The rotor 1 is constructed with two similar shaped spars 8 which carry the blower ducts and a plurality of transverse ribs 9. Stringers 10 connected between the ribs hold the blower ducts and slots 5. Sections of surface 11 are disposed between recesses 12 in the spars and stringers.

The spars 8 are formed with suction ducts 13 and narrow pasageways 14 which lead to the suction slots 4. The stringers 10 are formed with blower ducts 15 and outward and rearward curved restricted passageways 16 which lead to the blower slots 5.

These passageways and slots may be smaller near the root and greater near the tip to provide even distribution over the rotor.

As shown in FIG. 1, the leading edge section may be formed of one continuous molding with individual surface sheets 11 between adjacent spars and stringers and with a fabricated triangular rearward trailing edge section 7.

As shown in FIGS. 2 the rotor blade 1 has a tapered inward root section 17 which is connected to an upper terminus 18 of a mast 19. Concentric tubes 20 and 21 for the mast, and the tubes are provided to supply suction and pressure respectively to ducts within the blades as shown in FIG. 2A. Blower supply duct 22 connects tube 21 and the ducts serving the blower slot 5. Suction ducts 23 connect the moter tube 20 and ducts connected to suctions slots 4.

A transmission 24 is connected to the strong outer tube 20 to drive the moter tube with power from power shaft 25. An output shaft 26 leads to the tail rotor in a conventional manner.

Commutator assemblies are connected to the lower ends 27 and 28 to provide suction and blower pressure to the ducts.

Alternatively, the mast 19 is provided with three concentric tubes. The rotor is connected to the outer tube which is turned by transmission 24 and the inner tubes which are stationary are connected through commutator tupe slip connections to ducts 22 and 23. The connections are so established that differential pressures of suction and blower supply are provided to the rotor on different sides of the mast.

As shown in FIG. 3, the mast 29 has concentric tubes 30 and 31 which are connected to the helicopter blade 1. A rigid connector 32 connects the mast 29 and a root section 33 of blade 1 via a hinge 34. Flexible connector 35 connects the suction tube 30 with ducts leading to suction slots 4. Flexible connector 36 connects the pressure tube 31 to ducts associated with blower slots 5.

A conventional turbine type main propulsion engine is generally indicated by the numeral 40 in FIG. 4. A compressor 42 forces air into burner section 44. Combustion products drive turbine blades in section 46, which turn shaft 48, drawing the compressor blades in section 42 and driving a propellor shaft 50 through the intermediate reduction gearing.

The engine exhaust flow into an exhaust plenum chamber 52 and out through an exhaust duct 54. An over pressure relief valve 56 releases excessive exhaust gasses to the atmosphere.

An auxiliary engine 60 for blowing air purposes receives the exhaust gas from stack 54. Air from boundary layer suction ducts is drawn in through conduits 62 into plenum 64. Automatic blow-in doors 66 admit ambient air when auxiliary engine intake pressure falls below ambient air when auxiliary engine intake pressure falls below ambient pressure. A compessor in section 68 provides suction and drives the air toward blower to which further compresses the air into collection ring 72. Compressed air flows through air lines 74 and 78 past the fuel sprayer elements 76, which are served by fuel line 80.

A diffuser ring admits exhaust gasses from main exhaust duct 54 to the combustion chamber 84, where unburned products from the main exhaust are mixed with fuel in an excess of air and are combusted, producing an exhaust with a high kinetic energy.

The exhaust drives fan blades 88 driving shaft 90, which in turn spins the compressor 68 and the blower 70. Blower 70 forces air out conduit 2 which leads to boundary layer blower ducts for the rotor.

The exhaust of the auxiliary blower engine 60 passes into exhaust plenum 94 and out through conduits 98 to the blower ducts along the fuselage and control surfaces. Overpressure relief valve 96 dumps excessive exhaust into the atmosphere in unusual operating circumstances.

For fixed lift requirements the present invention decreases the need for rapid rotor velocity, and thereby decreases noise created by the ordinary and usual helicopter mechanics. Most importantly, smoothing out the boundary layer of a helicopter blade by using the present invention smooths out the air flow behind each blade, and thus smooths the air mass in which the following blades will move. This increases blade efficiency by increasing life, which again results in lower blade revolutions per minute, and decreases blade length requirements. Another benefit is gained by increasing blade chord and decreasing the number of blades necessary for flight.

Although the invention has been described with reference to specific embodiments, it will be obvious to those skilled in the art that further embodiments may be constructed and used without departing from the scope of the invention. The scope of the invention is defined in the following claims.

I claim:

1. Helicopter apparatus comprising a rotor having upper and lower surfaces comprising rotor skin plates extending longitudinally on the rotor and being spaced one from another in chordwise directions, spars extending into the rotor between the surfaces, ducts extending along inernal sides of the rotor surfaces, the ducts having relatively rigid surface-supporting structure and having outward directed openings extending across the rotor surfaces, interrupting the rotor surfaces between edges of the rotor skin plates, the ducts thereby forming structural elements supporting the rotor skin plates, the outward directed openings of the ducts being arranged perpendicularly to the rotor surfaces in a one portion of the rotor and tangential to the rotor surfaces in another portion of the rotor surfaces, suction means connected to the ducts with perpendicualar openings for drawing gas into the ducts through those openings and blowing means connected to the ducts with tangential openings for flowing gas out of the tangential openings, driving means connected to the suction means and to the blowing means for accelerating gas through the suction and blowing means.

2. The apparatus of claim 1 wherein each duct with a tangential opening has a tear-shaped cross section with a bulbous forward section containing a main passageway, and a tapered rearward section containing a restricted rearward directed passageway leading to a slot on one of said surfaces for blowing gas from the main passageway rearward over the surface.

3. The apparatus of claim 1 further wherein the blowing means further comprises a blower duct in a trailing edge of an airfoil, having a main passageway extending along the duct and having a passageway extending rearward to said tangential openings along the rotor near a trailing edge for directing blown gas rearward.

4. The apparatus of claim 1 wherein edges of the rotor skin plates are recessed in the ducts.

5. The rotary blade apparatus of claim 1 further comprising a shaft connected to the rotor and drive means connected to the shaft for driving the shaft and the rotor.

6. The apparatus of claim 5 wherein the shaft comprises first and second concentric tubes, the first of which is connected to the suction means and the second of which is connected to the blower means.

7. The apparatus of claim 6 wherein the driving means comprises an engine having an exhaust and further comprising a secondary combustion means having an intake forming said suction means and connected to the exhaust of the engine and the secondary combustion means having a secondary exhaust forming said blower means.

8. Helicopter apparatus of claim 1, the rotor having a leading edge and a trailing edge, and wherein the openings comprise a suction slot in one of said surfaces parallel to the leading edge and a blower slot in one of said surfaces adjacent the trailing edge, whereby aerodynamic affects of the helicopter rotor are improved.

9. The helicopter apparatus of claim 8 wherein the suction slot comprises at least one suction slot in the upper surface and at least one suction slot in the lower surface spaced slightly rearward from and parallel to the leading edge.

10. The helicopter apparatus of claim 9 wherein the blown slot comprises a blower slot in the upper surface and a blower slot in the lower surface spaced forward from and parallel to the trailing edge.

11. The apparatus of claim 8 wherein the suction slot is mounted in a forward upper portion of the rotor and the blower slot is mounted in a rearward upper portion of the rotor.

12. The apparatus of claim 11 further comprising additional blower slots mounted along a lower surface of the rotor.

13. The apparatus of claim 11 wherein the duct connecting the blower slot has a tear-shaped cross section with a bulbous forward section containing a main passageway, and a tapered rearward section containing a restricted rearward directed passageway leading to the tangential opening on the surface for blowing gas from the main passageway rearward over the surface.

14. The apparatus of claim 11 wherein the blower slot is near the trailing edge of the rotor, having a main passageway extending along the duct and having a passageway extending rearward and upward for directing blown gas rearward over the rotor.

15. The apparatus of claim 8 wherein the driving means comprises an engine having an exhaust and further comprising a combustion means connected to the exhaust and connected to the suction and blower slots for withdrawing air from the suction slot, combusting exhausts from the engine and blowing secondary exhausts from the combustion means through the blower slot.

16. The apparatus of claim 1 wherein the rotor is connected to a mast, and wherein the mast has parallel suction and blower tubes connected to the suction and blower means.

17. The apparatus of claim 16 wherein the suction and blower tubes are concentric.

18. The apparatus of claim 17 wherein the suction and blower tubes rotate with the rotor.

19. The apparatus of claim 18 wherein the rotor is hinged to the mast and further comprising flexible connections between the tubes and the rotor.

20. The helicopter apparatus of claim 1 comprising an engine mounted on the helecopter, means connected to the engine and to the rotor for turning the rotor and lifting and propelling the helecopter and an input and output connected to the engine for feeding and exhausting the engine, collecting means connected to the output for collecting matter therefrom, combustion means connected to the collecting means for receiving matter therefrom, intake means connected to the combustion means for flowing combustion sustaining material to the combustion means whereby combustion occurs in the combustion means, exhaust means connected to the combustion means for conducting exhaust from the combustion means, the ducts are connected to the exhaust means for conducting exhaust therefrom and distributing exhaust from the engine over said surfaces.

21. The apparatus of claim 20 wherein the intake means further comprises said ducts connected to openings on the rotor for withdrawing air from the surfaces of the rotor into the engine.

* * * * *